United States Patent
Wulf

(10) Patent No.: US 10,311,698 B2
(45) Date of Patent: Jun. 4, 2019

(54) METHOD AND DEVICE FOR DETECTING A TIREDNESS AND/OR SLEEPING STATE OF A DRIVER OF A VEHICLE

(71) Applicant: Robert Bosch GmbH, Stuttgart (DE)

(72) Inventor: Felix Wulf, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/556,892

(22) PCT Filed: Jan. 5, 2016

(86) PCT No.: PCT/EP2016/050039
§ 371 (c)(1),
(2) Date: Sep. 8, 2017

(87) PCT Pub. No.: WO2016/142074
PCT Pub. Date: Sep. 15, 2016

(65) Prior Publication Data
US 2018/0240319 A1    Aug. 23, 2018

(30) Foreign Application Priority Data

Mar. 10, 2015 (DE) ........................ 10 2015 204 247

(51) Int. Cl.
*G08B 23/00* (2006.01)
*G08B 21/06* (2006.01)
(Continued)

(52) U.S. Cl.
CPC .............. *G08B 21/06* (2013.01); *B60Q 9/00* (2013.01); *G06K 9/00597* (2013.01); *G06K 9/00845* (2013.01); *B60Y 2302/03* (2013.01)

(58) Field of Classification Search
None
See application file for complete search history.

(56) References Cited

U.S. PATENT DOCUMENTS

| 2006/0204041 | A1 | 9/2006 | Hammoud et al. |
| 2007/0115133 | A1 | 5/2007 | Boverie et al. |
| 2008/0068187 | A1* | 3/2008 | Bonefas ................ G06T 7/0004 340/575 |

FOREIGN PATENT DOCUMENTS

| DE | 102008007152 A1 | 10/2008 |
| JP | H11147428 A | 6/1999 |

(Continued)

OTHER PUBLICATIONS

English Translation of DE 102008007152 A1 is attached; Baumgarten Thorb et al.; Oct. 2008.*

(Continued)

*Primary Examiner* — Adolf Dsouza
(74) *Attorney, Agent, or Firm* — Norton Rose Fulbright US LLP; Gerard Messina

(57) ABSTRACT

A method for recognizing a state of tiredness and/or sleep of a vehicle driver. The method includes reading in a first and second eye opening signal, the first signal representing a degree of eye opening and/or a signal derived therefrom of the left eye of the driver of the vehicle and the second signal representing a degree of eye opening and/or a signal derived therefrom of the right eye of the driver of the vehicle. The method also includes recognizing a validity of the first and/or second signal to recognize the first signal as valid if the first signal corresponds to a first criterion and/or to recognize the second signal as valid if the second eye signal corresponds to a second criterion, and determining the state of tiredness and/or sleep of the driver of the vehicle using the first signal recognized as valid and/or the second signal recognized as valid.

13 Claims, 2 Drawing Sheets

(51) Int. Cl.
*B60Q 9/00* (2006.01)
*G06K 9/00* (2006.01)

(56) References Cited

FOREIGN PATENT DOCUMENTS

| | | |
|---|---|---|
| JP | H11339200 A | 12/1999 |
| JP | 2008065776 A | 3/2008 |
| JP | 2009118989 A | 6/2009 |
| JP | 2011152218 A | 8/2011 |

OTHER PUBLICATIONS

International Search Report for PCT/EP2016/050039, dated Mar. 24, 2016.

\* cited by examiner

METHOD AND DEVICE FOR DETECTING A TIREDNESS AND/OR SLEEPING STATE OF A DRIVER OF A VEHICLE

FIELD OF THE INVENTION

The present invention relates to a method for recognizing a state of tiredness and/or state of sleep of a driver of a vehicle, to a corresponding device, and to a corresponding computer program.

BACKGROUND INFORMATION

Sleepiness and microsleeps at the steering wheel frequently cause dangerous situations or accidents. Sleepiness recognizers for example output a warning when the driver exceeds a certain sleepiness boundary value (=coffee cup symbol).

This warning can however be ignored by the driver. Microsleeps are not recognized as a separate danger by many sleepiness assistants, and thus a timely warning does not take place.

Sleepiness recognition systems indirectly estimate the tiredness of the driver from the driving behavior. Microsleep is not taken into consideration as a separate source of danger.

Systems are also known that, using data from a video camera, can recognize the momentary degree of opening of the eyes (e.g. SmartEye, Facelab, etc.). This takes place using corresponding image processing algorithms. Here, in each case a level of eye opening is detected for both eyes.

SUMMARY OF THE INVENTION

Against this background, the approach presented here provides a method for recognizing a state of tiredness and/or sleep of a driver of a vehicle, as well as a device that uses this method, as well as, finally, a corresponding computer program, according to the main claims. Advantageous embodiments result from the respective subclaims and from the following description.

The approach presented here provides a method for recognizing a state of tiredness and/or sleep of a driver of a vehicle, the method having the following steps:

reading in a first eye opening signal and a second eye opening signal, the first eye opening signal representing a degree of eye opening and/or a signal derived therefrom of the left eye of the driver of the vehicle, and the second eye opening signal representing a degree of eye opening and/or a signal derived therefrom of the right eye of the driver of the vehicle;

recognition of a validity of the first and/or second eye opening signal in order to recognize the first eye opening signal as valid if the first eye opening signal corresponds to a first criterion and/or to recognize the second eye opening signal is valid if the second eye opening signal corresponds to a second criterion; and determination of the state of tiredness and/or sleep of the driver of the vehicle using the first eye opening signal, recognized as valid, and/or the second eye opening signal, recognized as valid.

A degree of eye opening can be understood for example as a value stating the percentage by which the eyelid covers the eye, or can also be the absolute distance of the lower and upper eyelid from one another. A signal derived from the degree of eye opening can for example be understood as an eye opening speed, i.e. a speed of movement of the eyelid, or an eye opening acceleration, i.e. an acceleration of the movement of the eyelid. For example, this signal can be ascertained via the first or second derivative of a movement of the eyelid in the determination of the degree of eye opening. In addition, an attribute can be assigned to the first and/or second eye opening signal that identifies the relevant eye opening signal as valid. Such an eye opening signal identified as valid satisfies a corresponding criterion. The first and/or second eye opening signal recognized as valid is then used in the determination of the state of tiredness and/or sleep of the driver of the vehicle.

The approach presented here is based on the recognition that a very robust recognition of the state of tiredness and/or sleep of the driver is possible when a plausibilized first and/or second eye opening signal is used for such a recognition. In this way, the ascertaining of a false value for a state of tiredness and/or sleep of the driver, due to measurement errors in the acquisition of a parameter of the eye or eyelid, can be excluded, or at least prevented to a great extent. The approach presented here thus offers the advantage of a significantly more robust and more reliable recognition of the state of tiredness and/or sleep of the driver, whereby false or erroneous warnings to the driver can be suppressed. This leads to a significant increase in the degree of acceptance by the driver of the tiredness recognition or sleep recognition, so that a corresponding warning has a higher probability of being taken seriously by the driver.

Also advantageous is a specific embodiment of the approach presented here in which, in the step of recognition, the first and/or second eye opening signal is recognized as valid when a value representing the eye opening speed of the left and/or right eye has a value that corresponds at most to a predetermined eye opening speed threshold value. Such a specific embodiment of the approach presented here offers the advantage that even when there is a vibration of the camera for acquiring the degree of eye opening, and a very fast movement of the eyelid is acquired that however is not caused by an actual movement of the eyelid but rather by the rapid vibrational movement of the camera, through the comparison with the eye opening speed threshold value it can be recognized that such a rapid movement cannot be a natural movement of a part of the eye. In this way, a robustness of the recognition of eye movements, or movements of parts of the eye, is significantly increased, thus reducing susceptibility to error in a corresponding tiredness recognition or sleep recognition.

Also advantageous is a specific embodiment of the approach presented here in which, in the step of reading in, in addition a head movement speed of the head of the driver of the vehicle is read in, the first and/or second eye opening signal being recognized as valid in the step of recognition if the head movement speed has a value that at most corresponds to a predetermined head movement speed threshold value. Such a specific embodiment of the approach presented here is based on the recognition that for example when traveling over uneven terrain the head of the driver will move about strongly, so that the acquisition of the actual degree of eye opening is thereby made possibly faulty. Due to the fact that the eye opening signal is recognized as valid when the head movement speed reaches at most a predetermined threshold value, such a possibly errored value of the eye opening signal when there are strong head movements can be suppressed for the determination of the state of tiredness or sleep of the driver.

Also advantageous is a specific embodiment of the approach presented here in which, in the step of reading in, in addition an orientation of the face of the driver of the vehicle is read in, the first and/or second eye opening signal being recognized as valid in the step of recognition when the orientation has a value that is within a predetermined orientation angular range. Such a specific embodiment of the approach presented here offers the advantage that possible errors in the recognition of the degree of eye opening due to a strong rotation of the head can be recognized, so that an eye opening signal at a time when there is such a strong rotation of the head is, as far as possible, not to be used for a tiredness recognition or sleep state recognition of the driver of the vehicle.

A state of tiredness or sleep of the driver can be recognized particularly reliably if, according to a further specific embodiment of the approach presented here, in the step of determining an overall eye opening signal is determined using the first and/or second eye opening signal recognized as valid, the state of tiredness and/or sleep of the driver of the vehicle being determined on the basis of the overall eye opening signal. Such a specific embodiment of the approach proposed here offers the advantage that smaller errors in the recognition of the degree of eye opening of a first eye can be compensated through the acquisition of the degree of opening of the second eye. It is also conceivable that one of the eye opening signals is not used at all for the determination of the tiredness and/or state of sleep of the driver if a deviation between the first and second eye opening signal is greater than a predetermined threshold value, because in this case, which, generally for anatomical reasons, will not occur in most people, it is to be assumed that there has been a faulty measurement of the degree of opening of an eye.

According to a further specific embodiment of the approach presented here, in the step of determining an eye opening signal not recognized as valid for determining the state of tiredness and/or sleep of the driver of the vehicle can be rejected, and/or a first eye opening signal recognized as valid and a second eye opening signal recognized as valid can be averaged in order to determine the state of tiredness and/or sleep of the driver. Such a specific embodiment of the approach presented here offers the advantage of a robust and at the same time technically very simple and therefore low-cost possibility for determining a degree of eye opening or a signal derived therefrom, and thus a simple possibility for recognizing a state of tiredness and/or sleep of the driver of the vehicle.

Also conceivable is a specific embodiment of the approach presented here in which, in the step of determining, there takes place an interpolation of a first and/or second eye opening signal over a time span within which the first and/or second eye opening signal is not recognized as valid. Such a specific embodiment of the approach proposed here also offers the advantage of a variant that is technically easy to realize and at the same time robust for recognizing the degree of eye opening or of the signal derived therefrom for one or both eyes.

Also advantageous is, in addition, a specific embodiment of the approach proposed here in which, in the step of determining, a segment of a first and/or second eye opening signal recognized as valid for determining the state of tiredness and/or sleep of the driver of the vehicle is rejected if the segment is shorter than a predetermined time duration threshold value. Particularly reliable is a specific embodiment of the approach presented here in which a time segment of an eye opening signal is used to recognize the state of tiredness and/or sleep of the driver of the vehicle when this time segment of the eye opening signal is longer than a predetermined time duration threshold value. In this way, it is ensured that brief measurement errors do not cause a false warning to the driver, which would reduce the future acceptance of such a warning on the part of the driver.

In order to make it possible to compensate short measurement errors of the degree of eye opening as well as possible in the determination of the state of tiredness and/or sleep of the driver of the vehicle, according to a further specific embodiment of the approach presented here the first and/or second eye opening signal recognized as valid, and/or the overall eye opening signal, can also be smoothed in the step of determining.

Also conceivable is a specific embodiment of the approach presented here in which, in the step of recognition, the first and/or second eye opening signal represents a degree of eye opening that is greater than a predetermined eye opening degree threshold value. Such a specific embodiment also enables a very robust recognition of a state of tiredness and/or sleep, because, due to physiological facts, at least at times the eye is opened far enough that the surrounding environment can also be perceived in a short time segment. A constant degree of eye opening below the eye opening degree threshold value is therefore physiologically improbable, and can be considered to be a false measurement, so that such a signal does not need to be taken into account for the determination of the state of tiredness and/or sleep of the driver.

In addition, the approach presented here provides a device for recognizing a state of tiredness and/or sleep of a driver of a vehicle, the device having the following features:

an interface for reading in a first eye opening signal and a second eye opening signal, the first eye opening signal representing a degree of eye opening and/or a signal derived therefrom of the left eye of the driver of the vehicle, and the second eye opening signal representing a degree of eye opening and/or a signal derived therefrom of the right eye of the driver of the vehicle;

a unit for recognizing a validity of the first and/or second eye opening signal in order to recognize the first eye opening signal as valid when the first eye opening signal corresponds to a first criterion, and/or to recognize the second eye opening signal as valid when the second eye opening signal corresponds to a second criterion; and a unit for determining the state of tiredness and/or sleep of the driver of the vehicle using the first eye opening signal recognized as valid and/or the second eye opening signal recognized as valid.

The approach presented here thus provides a device that is fashioned to carry out, control, or realize the steps of a variant of a method presented here in corresponding devices. Through this variant embodiment of the present invention in the form of a device as well, the underlying object of the present invention can be achieved quickly and efficiently.

In the present context, a device can be understood as an electrical apparatus that processes sensor signals and, as a function thereof, outputs control signals and/or data signals. The device can have an interface that can be fashioned as hardware and/or as software. In the case of a realization as hardware, the interfaces can for example be part of a so-called system ASIC that contains a wide variety of functions of the device. However, it is also possible for the interfaces to be separate integrated circuits, or to be made up at least partly of discrete components. In the case of a realization as software, the interfaces can be software modules present on a microcontroller alongside other software modules.

Also advantageous is a computer program product or computer program having program code that can be stored on a machine-readable carrier or storage medium such as a semiconductor memory, a hard disk memory, or an optical memory, and is used to carry out, realize, and/or control the steps of the method according to one of the specific embodiments described above, in particular when the program product or program is executed on a computer or device.

The approach presented here is explained in more detail in the following in exemplary fashion on the basis of the accompanying drawings.

DETAILED DESCRIPTION

Figure 1:
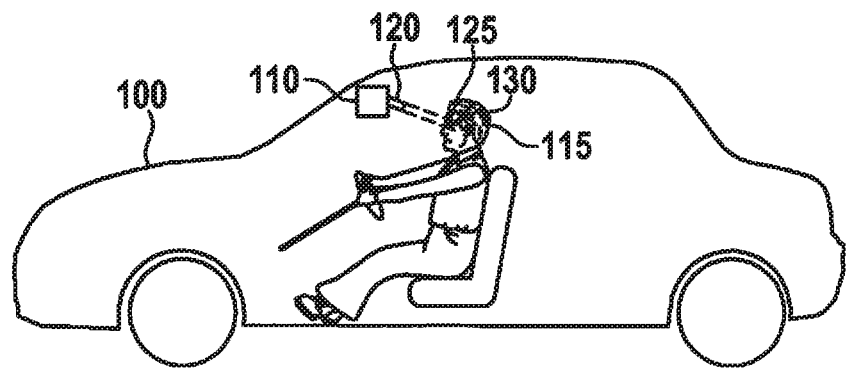
FIG. 1 shows a schematic diagram of a vehicle that an exemplary embodiment of a device for recognizing a state of tiredness and/or a state of sleep of a driver of the vehicle.

In the following description of advantageous exemplary embodiments of the present invention, the elements shown in the various Figures and having similar function are provided with identical or similar reference characters, and repeated description of these elements is omitted.

FIG. 1 shows a schematic diagram of a vehicle 100 that has an exemplary embodiment of a device 110 for recognizing a state of tiredness and/or state of sleep of a driver 115 of vehicle 100. Device 110 is here connected to a camera 120 that acquires eyes 125 of driver 115, in particular a position of an eyelid 130 of the left and/or right eye 125, and from this ascertains a degree of eye opening of the respective eye 125.

Figure 2:
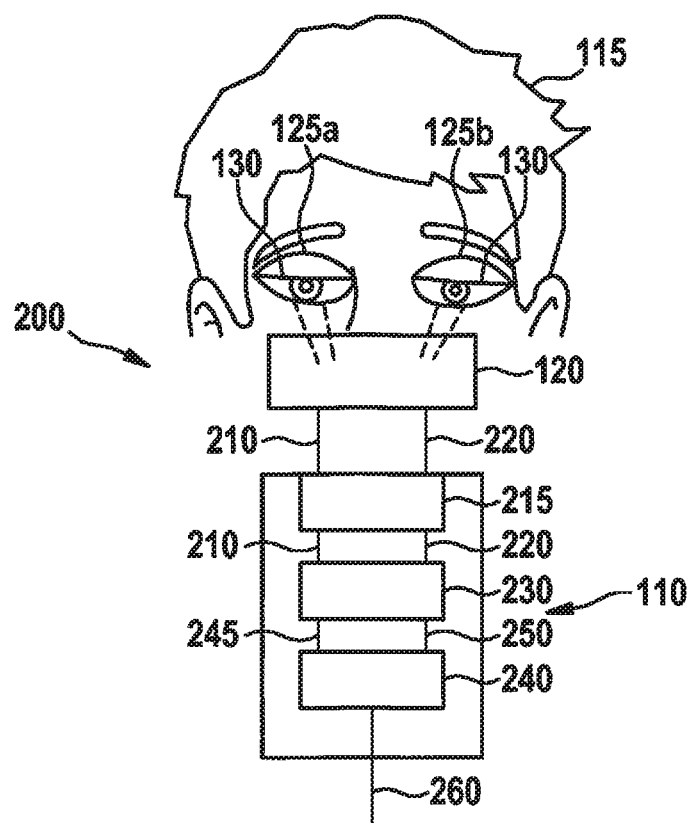
FIG. 2 shows a schematic diagram of a system for recognizing a state of tiredness or a state of sleep of the driver of the vehicle with a device for recognizing the state of tiredness and/or sleep of the driver of a vehicle according to an exemplary embodiment of the present invention.

FIG. 2 shows a schematic diagram of a system 200 for recognizing a state of tiredness and/or state of sleep of driver 115 of the vehicle, having a device 110 for recognizing the state of tiredness and/or sleep of driver 115 of a vehicle. Here, camera 120 sends a first eye opening signal 210 to an interface 215 for reading in, which signal represents a degree of eye opening, or a signal derived therefrom, of the left eye 125a. Here, the degree of eye opening can be a ratio of the lid closure of eyelid 130 of left eye 125a, between a completely open lid 130 and a completely closed lid 130. For example, first eye opening signal 210 can also represent a signal derived from the degree of eye opening, such as an eye opening speed or an eye opening acceleration of left eye 125a, for example if a temporal course of the positions of eyelid 130 is acquired by camera 120 and is correspondingly differentiated.

Analogously, camera 120 communicates a second eye opening signal 220 to interface 215 for reading in, that, analogous to first eye opening signal 310, here however represents a degree of eye opening or a signal derived therefrom of right eye 125b. Here, the degree of eye opening can also represent a ratio of the lid closure of eyelid 130 of the right eye 125b between a completely open lid 130 and a completely closed lid 130. For example, second eye opening signal 220 can also represent a signal derived from the eye opening degree, such as an eye opening speed or an eye opening acceleration of the right eye 125b, for example if a temporal course of the positions of eyelid 130 is acquired by camera 120 and is correspondingly differentiated.

Device 110 for recognizing the state of tiredness and/or state of sleep of driver 115 has in addition a recognition unit 230, to which the respectively read-in first eye opening signal 210 and second eye opening signal 220 are communicated by interface 215. In recognition unit 230, first eye opening signal 210 is recognized as valid if it corresponds to a first criterion, described in more detail below. In this case, a unit 240 for determining communicates a first eye opening signal 245 recognized as valid. In addition, in recognition unit 230, second eye opening signal 220 is recognized as valid if it analogously corresponds to a second criterion, also described in more detail below. In this case, determining unit 240 transmits a second eye opening signal 250 recognized as valid.

Here, the first criterion can be identical to the second criterion. However, it is also conceivable for the first criterion to be different from the second criterion, for example if different anatomical conditions are present for the left and right eye.

Determining unit 240 then determines the state of tiredness and/or state of sleep of driver 115 of vehicle 100, using first eye opening signal 245 recognized as valid and/or second eye opening signal 250 recognized as valid, and outputs a corresponding signal 260. This signal 260 then represents the state of tiredness and/or state of sleep of driver 115, and can for example be used to output a warning message in vehicle 100.

The approach presented here represents an improvement of the quality of recognition of the level of eye opening for tiredness recognition systems and microsleep recognition systems. Under the assumption that during travel the two eyes 125 move only together (and not separately from one another), the goal of the present invention is to improve the robustness and quality of recognition of the level of eye opening.

Here, access is had to the individual signals of the left eye 125a and the right eye 125b, and a common eye opening level, and possibly further parameters, are calculated. The approach presented here, which can also be referred to as Eye Closure Preprocessing (ECT), is divided into an overall system for recognizing sleepiness and/or microsleep, as is shown in more detail in FIG. 3 as a schematic diagram.

Figure 3:
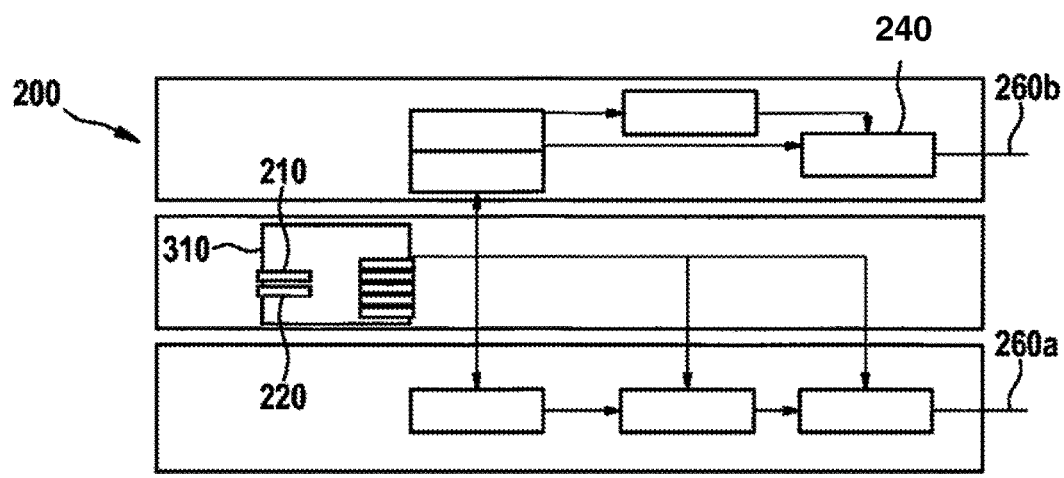
FIG. 3 shows a more detailed schematic diagram of a system for recognizing a state of tiredness and/or state of sleep of a driver of the vehicle.

FIG. 3 shows a more detailed schematic diagram of a system 200 for recognizing a state of tiredness and/or a state of sleepiness of a driver 115 of the vehicle. Here, first in a unit 310 an eye closure preprocessing (ECT) is carried out in which for example the degree of eye opening of the left and right eye is read in, corresponding output signals being acquired, such as a low pass-filtered degree of eye opening, an eye opening acceleration, an eye opening speed, and/or a validity of the relevant eye opening signal. To this extent, unit 310 of FIG. 3 corresponds to units 215 and 230 of device 110 corresponding to FIG. 2.

In a first variant of determining unit 240, a microsleep recognition can now be carried out, in which, on the basis of the signals supplied by unit 310, it is recognized whether microsleep behavior of driver 115 is actually present, and this is outputted in a first subsignal 260a.

In a second variant of determining unit 240, a tiredness classification of driver 115 can now take place. For this purpose, a classification of the tiredness of the driver is carried out, and a corresponding item of information is outputted in a second subsignal 260b.

With reference to FIG. 2, a first and second criterion have already been named that is/are to be used to recognize the first or second eye opening signal as valid. In the following, some possibilities are listed that may be used as such a criterion. Here, for simpler representation, only the criterion itself is presented that can be used as first and/or second criterion in recognition unit 230. First of all, it is to be noted that in the various exemplary embodiments of recognition unit 230, different variants of the first and second criterion can be used. However, it is also conceivable for identical criteria to be used as the first and second criterion.

The following validity criteria can be evaluated as the first and/or second criterion (for example separately for the right and left eye respectively). These criteria can be used in each case together, but also separately, in the resulting product:

- Availability: the signal (here the respective eye opening signal 210 or 220) should first of all be available.
- Quality: the quality signal 210, 220, 245 or 250 supplied by the image processing unit (here camera 210 or recognition unit 230) for the recognition of the respective eye should represent a degree of eye opening that is above a particular boundary value (e.g. >0.2).
- Eye opening speed: in many cases, the lid 130 recognized in the image jumps back and forth between two courses. This behavior can be recognized relatively easily by a jumping back and forth of the signal value in eye opening signal 210 or 220. Here, the resulting measured eye speed is greater than the physiologically maximal eyelid speed. Thus, as soon as this eyelid speed exceeds a particular boundary value, the associated regions of the eye opening degree or eye opening signal of the respective eye are marked as invalid. Otherwise, i.e. if the eyelid speed thus falls below a specified boundary value, the associated regions of the eye opening degree or eye opening signal of the respective eye are marked as valid.
- Head position: the resulting eye closure signal or eye opening signal 210 or 220 is usable only within particular head positions (e.g. head rotation less than 45° to the left or to the right). This can be recognized on the basis of the orientation of the face of driver 115, and the particular (angular) ranges can be marked as invalid or valid.
- Head speed: given a high dynamic of the head movement (e.g. traveling on a roadway having a large number of potholes), in many cases the image processing cannot track eye opening signal 210 or 220 of the actual position of the eyes 125 of driver 115 well enough, so that possibly incorrect results result in the evaluation of the degree of eye opening that are due to the inadequately fast tracking of the region of the eyes by the evaluation units in vehicle 100. Here, a solution that suggests itself is the use of a boundary value for the speed of the head. As soon as this value exceeds a particular boundary value, the associated regions of the eye opening signal are marked as invalid, or, otherwise, those (for example temporal) regions of the eye opening signal are recognized as valid in which the movement speed of the head of driver 115 is smaller than the boundary value.

In addition, the valid eye opening signals of the two eyes can also be combined to form an (overall) signal. The resulting overall eye opening signal can then be determined as a function of the validity of the eye opening signals of the left and right eye, for example as follows:

- if both (eye opening) signals are valid, a (possibly weighted) average value is formed. As weighting factors, here for example the quality signal of the image processing is a possibility. For this purpose, a quality parameter can be allocated to the first and/or second eye opening signal recognized as valid, which parameter represents the degree of reliability or validity of the value of the eye opening signal, and which can then be used for weighting in the formation of the average value.
- If only one (eye opening) signal is valid (left or right eye), then (only) this (eye opening) signal is used.
- If no (eye opening) signal is valid, then the resulting averaged eye closure signal, or a corresponding input signal, or corresponding input signals 245 or 250 for determining unit 240 are declared invalid, or are not declared as valid.

For the overall signal calculated in this way, and/or the respective eye opening signals 210 or 220, and/or the respective eye opening signals 245 or 250 recognized as valid, the following further processing steps are conceivable:

- Interpolation of short invalid regions (e.g. t_invalid<50 ms).
- Removal of short invalid regions (e.g. t_valid<1.5 s).
- Smoothing of the signal (e.g. using a Savitzky-Golay filter).

Using the calculated and smoothed degree of eye opening, in the context of the preprocessing further signals are calculated:

- Speed of eyelids 130 through differentiation of the eye opening signal and/or differentiation of a temporal behavior of the degree of eye opening
- Acceleration of eyelids 130 through differentiation of the speed signal and/or differentiation (in particular the second derivative) of a temporal behavior of the degree of eye opening
- Momentary level of eye opening (=eye opening without taking into account new blinks), e.g. using a Savitzky-Golay filter.

The signals 245 or 250 calculated in this way can be used for the detection of microsleep and sleepiness.

Figure 4:
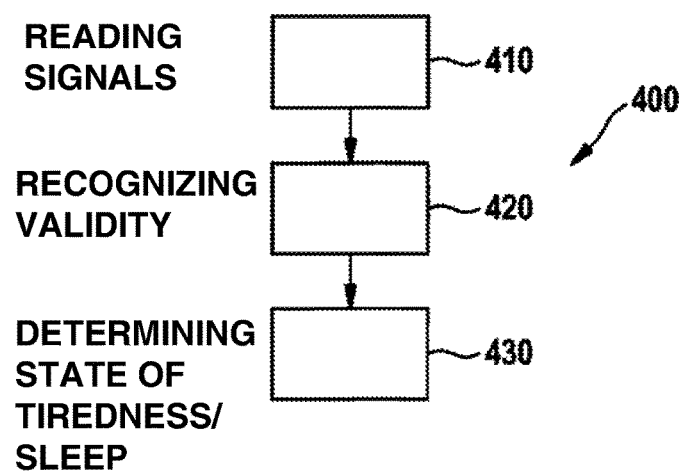
FIG. 4 shows a flow diagram of a method according to an exemplary embodiment of the present invention.

FIG. 4 shows a flow diagram of a method 400 for recognizing a state of tiredness and/or sleep of a driver of a vehicle. Method 400 includes a step 410 of reading in a first eye opening signal and a second eye opening signal, the first eye opening signal representing a degree of eye opening and/or a signal derived therefrom of the left eye of the driver of the vehicle, and the second eye opening signal representing a degree of eye opening and/or a signal derived therefrom of the right eye of the driver of the vehicle. In addition, method 400 includes a step 420 of recognizing a validity of the first and/or second eye opening signal in order to recognize the first eye opening signal as valid if the first eye opening signal corresponds to a first criterion, and/or to recognize the second eye opening signal as valid if the second eye opening signal corresponds to a second criterion. Finally, method 400 includes a step 430 of determining the state of tiredness and/or sleep of the driver of the vehicle using the first eye opening signal recognized as valid and/or the second eye opening signal recognized as valid.

The exemplary embodiments described and shown in the Figures have been selected only as examples. Different exemplary embodiments can be combined with one another completely or with regard to individual features. One exemplary embodiment can also be supplemented with features of a further exemplary embodiment.

In addition, the method steps presented here can be repeated, and can be carried out in a sequence differing from that described.

If an exemplary embodiment includes an "and/or" linkage between a first feature and a second feature, this is to be read as meaning that according to one specific embodiment the exemplary embodiment has both the first feature and the second feature, and according to a further specific embodiment the exemplary embodiment has either only the first feature or only the second feature.

What is claimed is:

1. A method for recognizing a state of tiredness and/or state of sleep of a driver of a vehicle, the method comprising:
    reading in a first eye opening signal and a second eye opening signal, the first eye opening signal representing a degree of eye opening and/or a signal derived therefrom of the left eye of the driver of the vehicle, and the second eye opening signal representing a degree of eye opening and/or a signal derived therefrom of the right eye of the driver of the vehicle;
    recognizing a validity of the first and/or second eye opening signal to recognize the first eye opening signal as valid if the first eye opening signal corresponds to a first criterion and/or to recognize the second eye opening signal as valid if the second eye opening signal corresponds to a second criterion; and
    determining the state of tiredness and/or state of sleep of the driver of the vehicle using the first eye opening signal recognized as valid and/or the second eye opening signal recognized as valid;
    wherein the degree of eye opening includes a ratio of a lid closure of an eyelid of the eye, between a completely open lid and a completely closed lid, and
    wherein the eye opening signals represent a signal derived from a degree of eye opening, including at least one of an eye opening speed or an eye opening acceleration of the eye.

2. The method of claim 1, wherein in the recognizing, the first and/or second eye opening signal is recognized as valid if a value representing the eye opening speed of the left and/or right eye has a value that does not exceed a predetermined eye opening speed threshold value.

3. The method of claim 1, wherein in the reading in, a head movement speed of the head of the driver of the vehicle is read in, the first and/or second eye opening signal being recognized as valid in the recognition if the head movement speed has a value that corresponds at most to a predetermined head movement speed threshold value.

4. The method of claim 1, wherein in the reading in, an orientation of the face of the driver of the vehicle is read in, the first and/or second eye opening signal being recognized as valid in the recognition if the orientation has a value that is within a predetermined orientation angular range.

5. The method of claim 1, wherein in the determining, an overall eye opening signal is determined using the first and/or second eye opening signal recognized as valid, the state of tiredness and/or state of sleep of the driver of the vehicle being determined on the basis of the overall eye opening signal.

6. The method of claim 1, wherein in the determining, an eye opening signal not recognized as valid is rejected for the determination the state of tiredness and/or state of sleep of the driver of the vehicle, and/or a first eye opening signal recognized as valid and a second eye opening signal recognized as valid are averaged in order to determine the state of tiredness and/or state of sleep of the driver.

7. The method of claim 1, wherein in the determining, there takes place an interpolation of a first and/or second eye opening signal and/or of the first and/or second eye opening signal recognized as valid over a time span within which the first and/or second eye opening signal and/or the first and/or second eye opening signal recognized as valid are not recognized as valid.

8. The method of claim 1, wherein in the determining, a segment of a first and/or second eye opening signal recognized as valid for determining the state of tiredness and/or state of sleep of the driver of the vehicle is rejected if the segment is shorter than a predetermined time duration threshold value.

9. The method of claim 1, wherein in the determining, the first and/or second eye opening signal recognized as valid and/or the overall eye opening signal are smoothed.

10. The method of claim 1, wherein in the recognizing, the first and/or second eye opening signal and/or the first and/or second eye opening signal recognized as valid represent a degree of eye opening that is greater than a predetermined eye opening degree threshold value.

11. A device for recognizing a state of tiredness and/or state of sleep of a driver of a vehicle, comprising:
    a reading arrangement to read in a first eye opening signal and a second eye opening signal, the first eye opening signal representing a degree of eye opening and/or a signal derived therefrom of the left eye of the driver of the vehicle, and the second eye opening signal representing a degree of eye opening and/or a signal derived therefrom of the right eye of the driver of the vehicle;
    a recognizing arrangement to recognize a validity of the first and/or second eye opening signal to recognize the first eye opening signal as valid if the first eye opening signal corresponds to a first criterion and/or to recognize the second eye opening signal as valid if the second eye opening signal corresponds to a second criterion; and
    a determining arrangement to determine the state of tiredness and/or state of sleep of the driver of the vehicle using the first eye opening signal recognized as valid and/or the second eye opening signal recognized as valid;
    wherein the degree of eye opening includes a ratio of a lid closure of an eyelid of the eye, between a completely open lid and a completely closed lid, and
    wherein the eye opening signals represent a signal derived from a degree of eye opening, including at least one of an eye opening speed or an eye opening acceleration of the eye.

12. A non-transitory computer readable medium having a computer program, which is executable by a processor, comprising:
    a program code arrangement having program code for recognizing a state of tiredness and/or state of sleep of a driver of a vehicle, by performing the following:
        reading in a first eye opening signal and a second eye opening signal, the first eye opening signal representing a degree of eye opening and/or a signal derived therefrom of the left eye of the driver of the vehicle, and the second eye opening signal representing a degree of eye opening and/or a signal derived therefrom of the right eye of the driver of the vehicle;
        recognizing a validity of the first and/or second eye opening signal to recognize the first eye opening signal as valid if the first eye opening signal corresponds to a first criterion and/or to recognize the second eye opening signal as valid if the second eye opening signal corresponds to a second criterion; and determining the state of tiredness and/or state of sleep of the driver of the vehicle using the first eye opening signal recognized as valid and/or the second eye opening signal recognized as valid;

wherein the degree of eye opening includes a ratio of a lid closure of an eyelid of the eye, between a completely open lid and a completely closed lid, and wherein the eye opening signals represent a signal derived from a degree of eye opening, including at least one of an eye opening speed or an eye opening acceleration of the eye.

13. The non-transitory computer readable medium of claim 12, wherein in the recognizing, the first and/or second eye opening signal is recognized as valid if a value representing the eye opening speed of the left and/or right eye has a value that does not exceed a predetermined eye opening speed threshold value.

* * * * *